(12) United States Patent
Donfried et al.

(10) Patent No.: US 9,251,327 B2
(45) Date of Patent: Feb. 2, 2016

(54) METHOD AND SYSTEM FOR PROVIDING BEHAVIORAL BI-DIRECTIONAL AUTHENTICATION

(75) Inventors: Paul A. Donfried, Richmond, MA (US); Steven T. Archer, Dallas, TX (US); Guy S. Tallent, New York, NY (US); Ashley Evans, Stonington, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 163 days.

(21) Appl. No.: 13/223,981

(22) Filed: Sep. 1, 2011

(65) Prior Publication Data

US 2013/0061285 A1 Mar. 7, 2013

(51) Int. Cl.
*G06F 21/00* (2013.01)
*G06F 21/31* (2013.01)

(52) U.S. Cl.
CPC .................................. *G06F 21/316* (2013.01)

(58) Field of Classification Search
None
See application file for complete search history.

(56) References Cited

U.S. PATENT DOCUMENTS

| | | | |
|---|---|---|---|
| 2003/0158960 A1* | 8/2003 | Engberg | 709/237 |
| 2006/0200855 A1* | 9/2006 | Willis | 726/2 |
| 2007/0136573 A1* | 6/2007 | Steinberg | 713/155 |
| 2008/0222706 A1* | 9/2008 | Renaud et al. | 726/4 |
| 2011/0016534 A1* | 1/2011 | Jakobsson et al. | 726/28 |
| 2011/0131122 A1* | 6/2011 | Griffin et al. | 705/35 |
| 2011/0131123 A1* | 6/2011 | Griffin et al. | 705/35 |
| 2011/0131130 A1* | 6/2011 | Griffin et al. | 705/38 |
| 2011/0131131 A1* | 6/2011 | Griffin et al. | 705/38 |
| 2011/0162073 A1* | 6/2011 | Jeschke et al. | 726/25 |
| 2011/0313872 A1* | 12/2011 | Carter et al. | 705/16 |
| 2011/0314558 A1* | 12/2011 | Song et al. | 726/28 |
| 2012/0109802 A1* | 5/2012 | Griffin et al. | 705/35 |
| 2012/0137340 A1* | 5/2012 | Jakobsson et al. | 726/1 |
| 2013/0042327 A1* | 2/2013 | Chow | 726/28 |

\* cited by examiner

*Primary Examiner* — Jeffery Williams

(57) ABSTRACT

An approach for authenticating parties engaged in a web-based transaction without compromising the integrity or anonymity of the parties is described. An authentication platform receives, from a first application associated with a first party, an authentication request that has been redirected in response to a transaction initiated with a second application associated with a second party. The authentication platform forwards knowledge based assessment information to the first application that is based on determined behavioral information for authenticating the second party to the first party. A valid response to the knowledge based assessment information by the first application provides authentication of the first party to the second party.

20 Claims, 6 Drawing Sheets

METHOD AND SYSTEM FOR PROVIDING BEHAVIORAL BI-DIRECTIONAL AUTHENTICATION

BACKGROUND INFORMATION

It is commonplace for one party to engage in a transaction with another party directly over a public data communications network, such as the global Internet. In these types of transactions, be it for engaging in a purchase transaction, facilitating a trade or exchanging vital information, the parties involved may be anonymous to one another. The anonymity associated with parties corresponding via the Internet or other network medium can lead to trust concerns that prevent otherwise successful transactions from occurring, particularly in the area of commercial collaboration. Unfortunately, many traditional methods for authenticating parties involved in a transaction require the exchange of sensitive information regarding the parties involved, which jeopardizes anonymity.

Based on the foregoing, there is a need for an effective and reliable way to authenticate parties without compromising the integrity or anonymity of respective members.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for authenticating two or more parties engaged in a web-based transaction without compromising the integrity or anonymity of respective parties is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
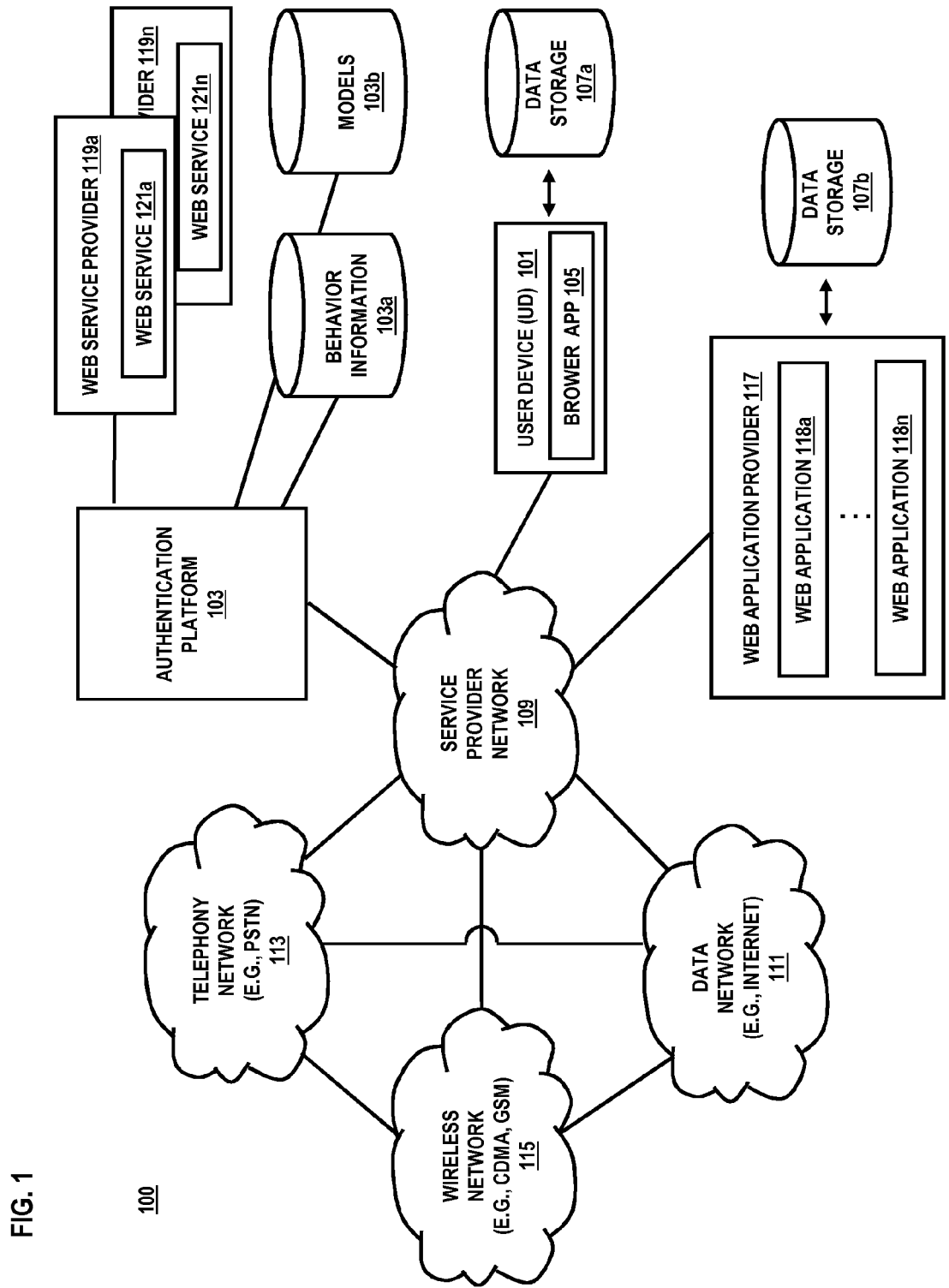
FIG. 1 is a diagram of a system for authenticating parties engaged in an on-line transaction while maintaining anonymity of the respective parties, according to one embodiment.

FIG. 1 is a diagram of a system for authenticating parties engaged in an on-line transaction, according to one embodiment. System 100 encompasses an authentication platform 103 that is maintained by an independent, trusted source, which provides services for authenticating parties engaged in an on-line transaction. In certain embodiments, the on-line transaction includes a web-based transaction, which supports on-line commerce via a web portal (e.g., websites). By way of example, the trusted source may be established or confirmed by the parties involved in the transaction during initial engagement of the transaction. Alternatively, the authentication platform 103 may perform various authentication, verification and/or validation tasks on behalf of at least one party involved in an on-line (e.g., web-based) transaction (e.g., a relying party) with other parties (e.g., subject parties). Under this scenario, at least one party requests involvement of the authentication platform 103 as a third-party service for providing the relying party with data indicating a degree or level of trustworthiness, validity, authenticity or legitimacy of the other parties.

As an independent provider, the trusted source for maintaining the authentication platform 103 has no vested interest in the outcome of the transaction or the involved parties. Also, the authentication platform 103 may be accessed confidentially, such that information provided to or requested by a given party is not shared with other parties, outside of a given transaction, or combination thereof. It is noted that the authentication platform 103 may be utilized within the context of a transactional processing system, network or cyber security framework, enterprise or business management system, or a combination thereof for enabling a means of risk or knowledge based assessing and authenticating in the performance of web-based transactions.

In certain embodiments, "knowledge based assessments" or "knowledge based authentication" (KBAs) within the context of determining behavioral information regarding parties collaborating over a network 109 pertains to approaches, logic and operations schema for characterizing the behavior of client/server collaboration schemes, autonomic systems or web-based response systems. By characterizing the behavior of such systems, the identity of one or more parties, i.e., users, applications, devices or services, associated with or encompassing the systems may be determined. "Behavior information," upon which an assessment or authentication request may be fulfilled, may include in certain embodiments data for characterizing a current state of a given party, a current environmental, usage or transactional context of a given party or a mode of operation of a device, service, application or user associated therewith. Alternatively, the behavior information may pertain to historical variations of the aforementioned. For purposes of illustration, KBAs may process behavior information based on various models, logical definitions and other data assessment mechanisms and schemes. Such models are stored by the authentication platform 103 in a model database 103b. It is noted that the term "knowledge based assessment" and "knowledge based authentication" may be used synonymously.

Parties collaborating with one another to perform a web-based transaction may execute various processes involving the exchange of sensitive information (e.g., personal and/or financial data). Depending on the mode of operation of the involved parties, processes are performed on a self-driven, automated or user-driven basis. By way of example, a first party engaging in a transaction with respect to system 100 may utilize a web browser application 105 at a user device 101, while the second party pertains to one or more web applications 118a-118n provided by a web application provider 117. Web applications 118a-118n may operate singularly or in combination to provide for the execution of one or more processes for carrying out a functional task via the web browser application 105. In certain embodiments, a "party" pertains to a user, group, device, service or application configured to interact with another user, group, device, service or application for performing a mutually agreed upon task. However, for the purpose of illustration, it is assumed that a "party" pertains to an application that is capable of collaborating over a network 109 with another application, regardless of whether the respective applications are user-driven, automated or self-driven.

The web application service provider 117 may host respective web applications 118*a*-118*n* by way of one or more servers, host network systems and server applications. Information provided by an interacting party is maintained by the web application 118 in a data store 107*b* for subsequent processing and use in relation to the transaction. A party operating a user device 101 accesses the web applications 118*a*-118*n* by way of a browser application 105. In certain embodiments, user device 101 may be any type of mobile terminal, fixed terminal, or portable terminal including a mobile handset, station, unit, device, multimedia computer, multimedia tablet, Internet node, communicator, desktop computer, set-top box (e.g., television system), laptop computer, Personal Digital Assistants (PDAs), Smartphone or any combination thereof. It is also contemplated that the user devices 101*a*-101*n* can support any type of interface for supporting the presentment of the different web applications 118*a*-118*n*. User devices 101 may facilitate various input means for receiving and generating information, including touch screen capability, keyboard and keypad data entry, voice-based input mechanisms and the like. The user device may also feature a data store 107*a* for maintaining data provided to it by a web application 118. Any known and future implementations of user devices 101 are applicable.

"Transactions" as performed between collaborating user devices and web applications in certain embodiments, pertain to processes, sub-processes or series thereof for fulfilling commercial, business, enterprise, government, social or technological tasks over electronic mediums such as the Internet and other computer networks (e.g., service provider network 109). By way of example, this may include e-commerce, e-business, social commerce, business-to-business, business-to-commerce, mobile commerce and other online or web-based tasks for buying, selling, marketing and/or evaluating products, goods or services. Also, transactions may pertain to specific schemes as coordinated between parties. In certain transactional schemes, a first party operating a browser application 105 may interact directly in real-time with a web application service provider 117 that hosts one or more web applications 117*a*-117*n*. By way of example, a consumer acting as a first party may access an online bookseller acting as a second party to purchase, sell or trade books. As another example, a consumer may access an online ticket services provider to engage in the purchase or selling of tickets for concerts, theatres and other entertainment related venues.

In another transactional scheme, however, the first party may interact indirectly with a second party by way of an intermediary party that acts on the second party's behalf. As an example, a user of a web browser application 105 may access an online travel brokerage services provider that provides a web application for arranging, comparing and purchasing travel related products and services from various other web applications hosted by different airline companies, car rental companies, hotel providers, etc. Under this scenario, the online travel brokerage is an intermediary party for facilitating the purchase, coordination, comparing and or other tasks/transactions on behalf of the user of the web browser application 105 (first party) and the travel and accommodation service providers (second party). It is noted that system 100 accommodates any type of transactional scheme. Furthermore, system 100 may accommodate multi-party (more than two) collaboration as well as multi-directional (back-and-forth) collaboration between respective parties via a network 109.

Service provider network 109 may be any suitable wireline and/or wireless network, and be managed by one or more service providers. For example, in addition to a public switched telephone network (PSTN) as configured by a telephony network 113, network 111 and 115 may include an integrated services digital network (ISDN) or other like network. In the case of a wireless network configuration, networks 113 and 117 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, networks 109-115 may be completely or partially contained within one another, or may embody one or more of the aforementioned infrastructures. It is further contemplated that networks 109-115 may include components and facilities to provide for signaling and/or bearer communications between the various components or facilities of system 100. In this manner, they may embody or include portions of a signaling system 7 (SS7) network, or other suitable infrastructure to support control and signaling functions.

As noted, the Internet and other public networks are now used for commercial transactions of all types. Typically, web-based transactions between respective parties involved in the transaction are often more convenient and less expensive than performing "off-line" transactions (or conventional "brick-and-mortar" transactions; such as through point-of-sales terminals). By way of example, a purchase transaction between a consumer and an online seller of goods and services can be readily conducted on the Internet (or World Wide Web), where only the virtual or information and not physical presence of the transacting parties is required to facilitate the transaction. This approach advantageously preserves anonymity of the involved parties. However, with this anonymity there can also be a lack of trust or confidence between the transacting parties and especially those members of a particular party who are new to engaging in a commercial transaction over a network with the other party. Consequently, each party involved in the transaction may benefit from an effective means of authenticating the other involved party, so as to validate the trustworthiness or reliability of the others, verify the integrity of the transaction, etc. Unfortunately, current methods for authenticating parties involved in a transaction over the Internet do not account for the differing behavioral characteristics demonstrated by respective parties. Still further, current methods for enabling parties to perform transactions with some degree of trust may require the exchange of sensitive information regarding the parties involved, which jeopardizes anonymity.

To address this issue, system 100 introduces an authentication platform 103 that utilizes captured, detected or acquired behavioral information of a first party and a second party for performing authentication of each to the other without compromising the privacy of the behavioral information. In addition, the authentication platform 103 delivers a knowledge based assessment or authentication (KBA) to the first party and/or second party, using private, behavioral information as the knowledge base. Under this scenario, the authentication platform 103 as provided by a trusted source is able to authenticate the second party to the first party by reference and to authenticate the first party to the second party by reference. It is noted that the knowledge based assessment/authentication is generated by the authentication platform 103 using data provided by one or more web services 121a-121n, all of which may be used singularly or in combination to characterize the behavior of the involved parties. This includes services offered by various service providers 119a-119n for acquiring data regarding internet protocol (IP) addresses, geo-spatial/location data, context data, call log data, radio frequency identification data and other information pertaining to the one or more transacting parties. This information is maintained by the authentication platform 103 in a behavior information database 103a. As mentioned, the behavior information 103a is subsequently processed based on various models maintained in a model database 103b.

Figure 2:
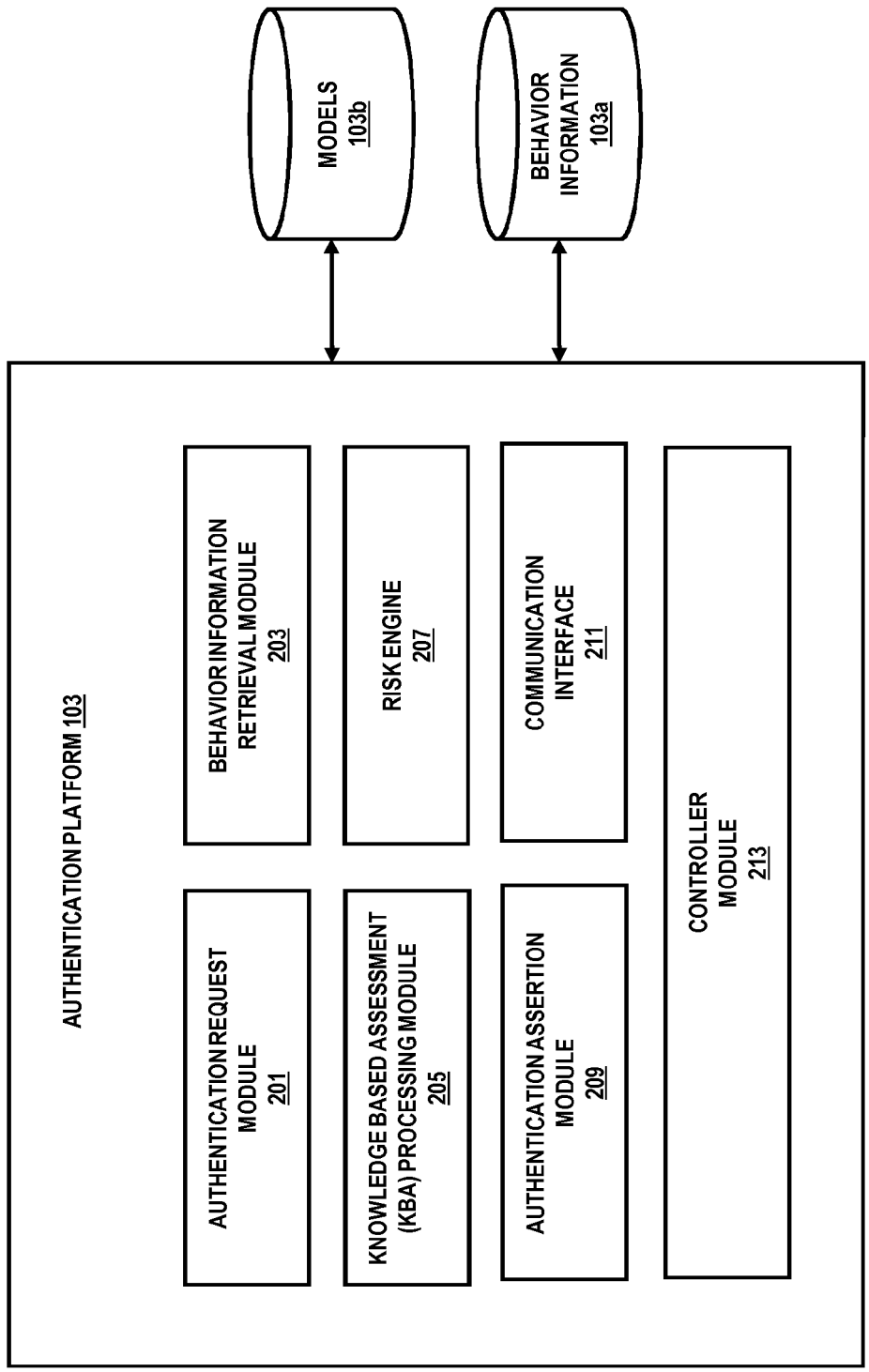
FIG. 2 is a diagram of an authentication platform for authenticating two or more parties engaged in an on-line transaction while maintaining anonymity of the respective parties, according to one embodiment.

FIG. 2 is a diagram of an authentication platform for authenticating two or more parties engaged in an on-line transaction while maintaining anonymity of the respective parties, according to one embodiment. The authentication platform 103 includes various executable modules for performing one or more computing, data processing and network based instructions that in combination provide a means of enabling the provisioning of resources of a packetized voice communication solution provider. Such modules can be implemented in hardware, firmware, software, or a combination thereof. By way of example, the authentication management platform 103 may include an authentication request module 201, behavior information retrieval module 203, knowledge based assessment/authentication (KBA) processing module 205, risk engine 207, authentication assertion module 209, communication interface 211 and controller module 213. It is noted that these modules perform various tasks for enabling one or more parties involved in a transaction to determine an extent of reliability, trust or confidence in other parties to the transaction.

In one embodiment, the authentication request module 201 receives requests from at least one party engaged in a web-based transaction. The authentication request may be redirected to the authentication request module 201 by the at least one party in response to initiation of a transaction with another party. Authentication requests may include a notification that an authentication or validation of other parties is required, the level of authentication to be performed, the general category of the transaction (e.g., purchase transaction, trade transaction, installation process), transaction statistics, anonymous details regarding the involved parties (e.g., specified location, web handle or alias), etc. By way of example, a web application services provider 117 acting as a second party (e.g., a relying party) may submit a request to the authentication request module 201 for authenticating a user of a web browser application 105 at a user device 101 acting as a first party (e.g., subject) in a transaction. The authentication request module 201 detects and processes the request from the web application services provider—i.e., as the user engages a web application 117a-117n—based on a subscription agreement or other arrangement between the web application provider 117 and the trusted source that maintains the authentication platform 103. It is noted the authentication request module 201 may also receive and process multiple requests concurrently from different parties associated with the same transaction.

In one embodiment, the behavior information retrieval module 203 interacts with other web services 121a-121n responsive to a received authentication request to interrogate or retrieve real-time behavioral characteristics pertaining to the parties involved in the transaction. Information gathered by the behavior information retrieval module 203 may include network addresses (e.g., internet protocol (IP) addresses), geo-spatial/location data, call log information, context data, radio frequency identification data and other information pertaining to the one or more transacting parties. Behavior information may also include context information—i.e., data pertaining to the immediate environment of the subject as detected by way of one or more sensors of the user device 101, data representative of recent or prior activities or transactions of the user or the user device 101, etc. It is noted that the behavior information may be obtained without expressly identifying the name of the party subject to the interrogation. Furthermore, the various web services 121a-121n may be executed as background tasks, such that no disruption or delay of the transaction between respective parties need occur. The data is maintained in a behavior information database 103a for subsequent analysis.

Alternatively, the behavior information retrieval module 203 may acquire data through a direct interrogation or question and answer response mechanism. By way of example, a first party associated with the web browser application 105 may be presented with historic behavior information by the authentication platform operating in behalf of or conjunction with the web application 118, such as call log data for various subscribers to the web application service provider 117. The web browser application 105 may then be presented with an authentication question, such as: which of the presented telephone numbers are inbound calls? Accordingly, input of selection of the correct number can provide some additional indication of the authenticity of the responding first party. It is noted that this bi-directional interaction in combination with the various processing techniques of the authentication platform 103 may be used to render a qualitative and quantitative assessment of the authenticity of the first party.

The authentication platform 103, according to one embodiment, also includes a KBA processing module 205, which processes the behavior information to assess or authenticate the party associated with the behavior information, according to an embodiment. By way of example, the KBA processing module 205 processes data using various ontological models for perceiving data representing the behavioral dynamics of parties (e.g., behavior information), fuzzy logic associated with specific environmental, network or usage conditions, pattern matching and predictive analytics schema for interpreting real-time behavioral characteristics and other mechanisms for interpreting the behavior information data for a given transactional context.

In one embodiment, operating in connection with the KBA processing module 205 is a risk engine 207 that generates an identity and/or a risk score based on the assessment of the behavior information by the KBA processing module 205. By way of example, when the KBA processing module 205 matches behavior information such as geo-spatial/location data with a (user) specified location of a party involved in the transaction, the risk engine 207 generates a value indicating the degree to which the geo-spatial/location data matches the location specified by the party. Under this scenario, greater affinity between the detected behavior information and any available details associated with the party (e.g., non-identifying details), results in a higher identity and/or risk score. Conversely, lower affinity results in a lesser identity and/or risk score.

It is noted that the identity score (for indicating the extent to which a party may be identified based on the retrieved behavior information) and risk score (for indicating the level of risk assumed by transacting with the party in question based on the assessment) may be combined into a single composite score or maintained separately by the risk engine 207. In one embodiment, respective parties involved in the transaction upon which the authentication request originated may make transactional decisions based on the determined KBA and risk assessment results. For example, a web application 117 may be configured to allow or deny a purchase transaction when an identify score and/or risk score associated with a purchasing user is within a pre-determined threshold. As another example, a user of a browser application 105 may be configured to restrict or permit a payment transaction based on a determined risk and/or identity score. Of note, the action taken may be based on the authentication request information (e.g., risk and/or identity score, behavior information) returned to the party for initiating the request.

In one embodiment, the authentication assertion module 209 submits a notification of the identity and/or risk score as generated by the risk engine 207 to the party that initiated the authentication request. By way of example, when the first party is associated with a browser application 105 configured to generate the authentication request, and the transaction involves requesting a web page from a second party associated with a second application, the authentication assertion module 209 redirects an authentication assertion message through the browser application 105 to the second application. The authentication notification/assertion message may be exchanged seamlessly without affecting the web browser application 105. It is noted that the authentication assertion module 209 may be configured with respect to the security and privacy protection policies and settings of the web browser application 105.

In one embodiment, a communication interface 211 enables formation of a session over a network 109 between the authentication platform 103 and the browser application 105. By way of example, the communication interface 211 presents various protocols and data sharing techniques for enabling collaborative execution between a user device (e.g., mobile devices, laptops, Smartphones, tablet computers, desktop computers, set-top boxes) and the authentication platform 103 over the service provider network 109. Additionally, in one embodiment, a controller module 213 is configured to regulate the communication processes between the various other modules 201-211. For example, the controller module 213 generates the appropriate signals to control the communication module 211 for facilitating transmission of data over the network 109.

Figure 3B:
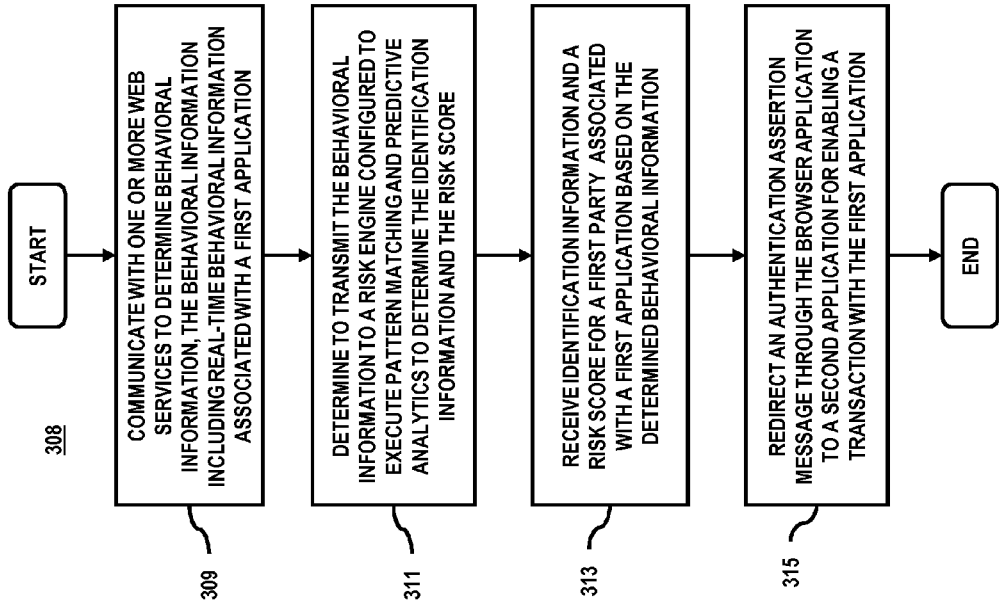
FIGS. 3A and 3B are flowcharts of processes for authenticating a first and second party for enabling an on-line transaction while maintaining anonymity of the respective parties, according to various embodiments.
Figure 3A:
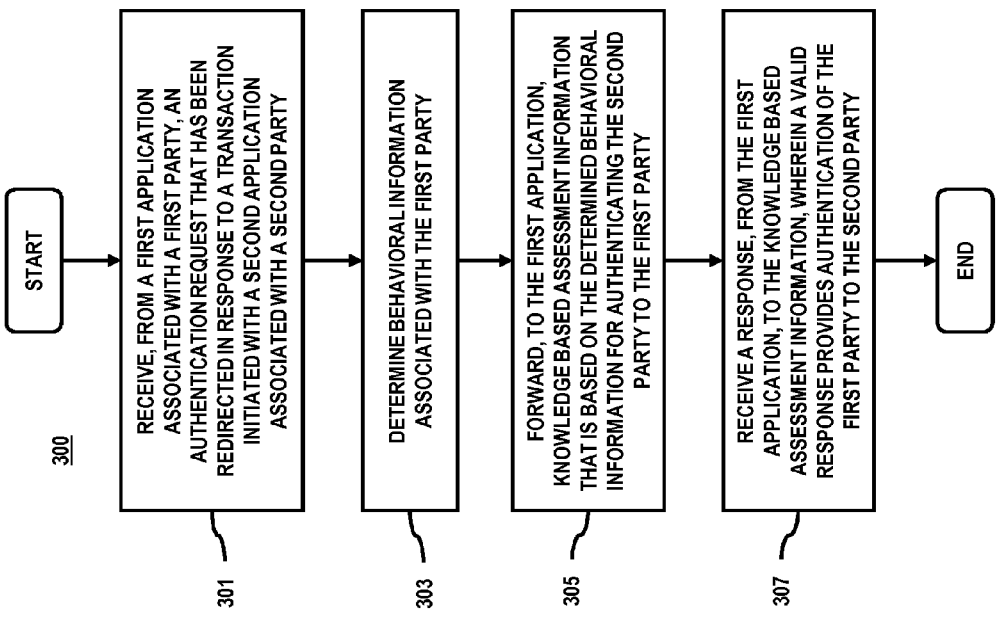

FIGS. 3A and 3B are flowcharts of processes for authenticating a first and second party for enabling an on-line transaction while maintaining anonymity of the respective parties, according to various embodiments. For the purpose of illustration, the processes are described with respect to the system 100 of FIG. 1. It is noted that the steps of processes 300 and 308 may be performed in any suitable order, as well as combined or separated in any suitable manner. In step 301 of process 300, the authentication platform 103 receives, from a first application associated with a first party, an authentication request that has been redirected in response to a transaction initiated with a second application associated with a second party. In step 303, behavioral information associated with the first party is determined by the authentication platform 103. As mentioned previously, the behavior information is any data for characterizing the behavior of the first party, and particularly, as the party interacts with the second party using the first application. In step 305, the authentication platform 103 forwards to the first application, knowledge based assessment information that is based on the determined behavioral information for authenticating the second party to the first party. In another step 307, the authentication platform 103 receives a response from the first application, to the knowledge based assessment information, wherein a valid response provides authentication of the first party to the second party. It is noted, therefore, that all parties to the transaction are validated accordingly.

As shown in FIG. 3B, in step 309 of process 308, the authentication platform 103 communicates with one or more web services to determine the behavioral information. The behavioral information includes real-time behavioral information associated with a first application. In step 311, the authentication platform 103 also determines to transmit the behavioral information to a risk engine configured to execute pattern matching and predictive analytics to determine the identification information and the risk score. As explained, the identity and risk score provide an indication of the extent of trust, validity, confidence and security associated with a given party to the transaction. Also, the authentication platform 103, per step 313, receives identification information and a risk score for the first party, as generated by the risk engine based on the determined behavioral information. In step 315, the authentication platform 103 redirects an authentication assertion message through the browser application 105 to the second application. It is noted that respective applications may be configured to behave in pre-determined ways responsive to the assertion message.

The above process, according to certain embodiments, advantageously ensures a trusted transaction without compromising the anonymity of the parties.

Figure 4:
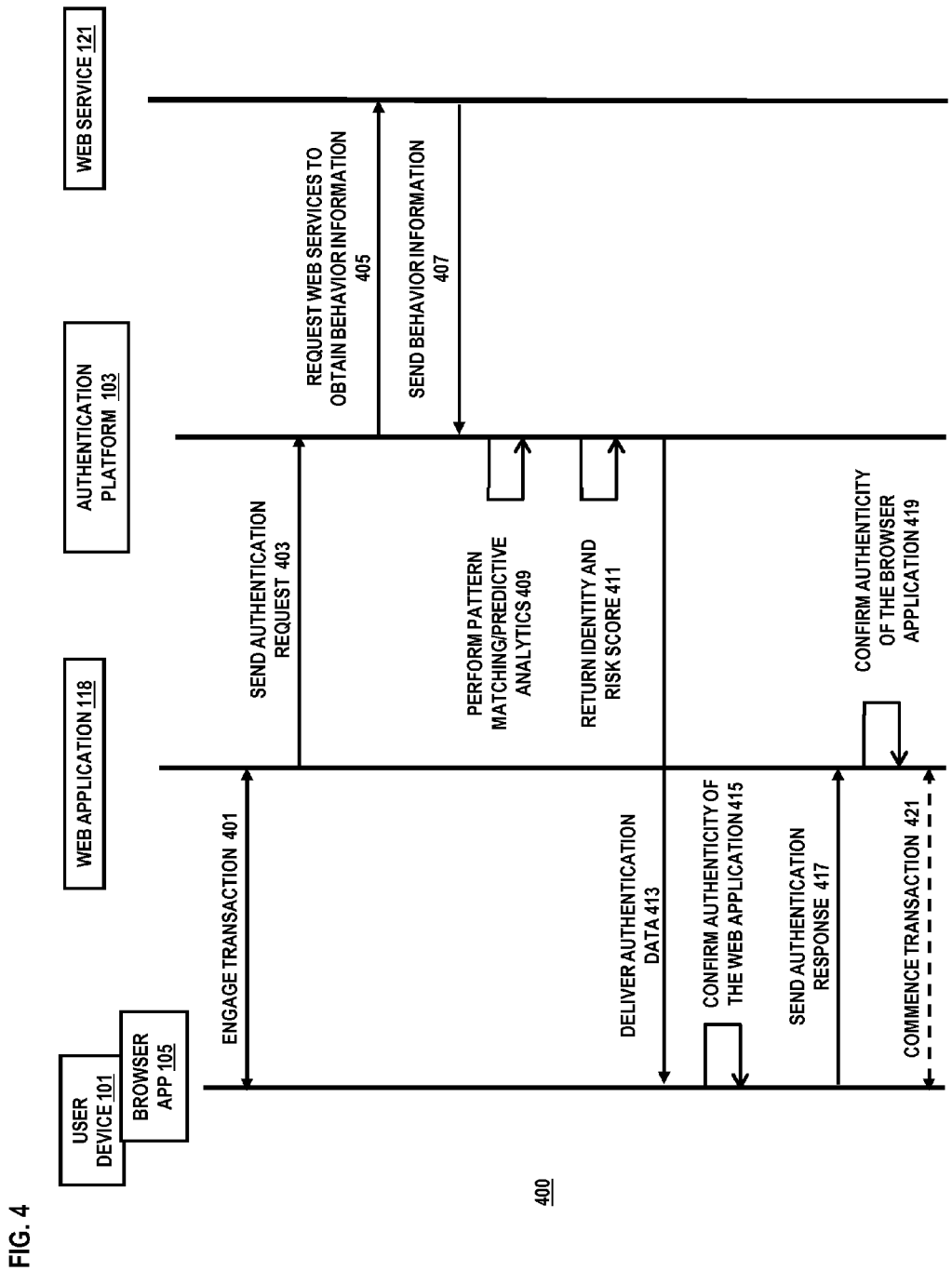
FIG. 4 is a ladder diagram showing a process for authenticating a first and second party for enabling an on-line transaction while maintaining anonymity of the respective parties, according to an exemplary embodiment.

A use case of the bi-directional behavioral authentication involving web-based applications and services is now explained with respect to FIG. 4.

FIG. 4 is a ladder diagram showing a process for authenticating a first and second party for enabling an on-line transaction while maintaining anonymity of the respective parties, according to an exemplary embodiment. Process 400 is executed based on interaction between a user device 101 operating a web browser application 105, a web application 118, an authentication platform 103 and a web service 121. In step 401 the browser application 105 engages in a web-based transaction with the web application. Responsive to the transaction, in step 403 the browser application 105 associated with the user of the user device 101 sends an authentication request to the authentication platform 103. It is noted that the authentication request has been redirected in response to initiation of the transaction at step 401.

Upon receiving the request, the authentication platform 103 requests one or more web services 121 to obtain behavior information pertaining to the user, user device 101 and/or browser application 105, corresponding to step 405. As mentioned, the web services may acquire, detect, interrogate and otherwise compile this information, then send it back to the authentication platform 103 for processing, as in step 407.

Upon receiving the behavior information, the authentication platform 103 may perform various tasks including performing pattern matching/predictive analytics and generating an identity and risk score based on the behavior information, corresponding to steps 409 and 411 respectively. It is noted that the above described processing steps are facilitated through collaborative or concurrent execution of the KBA processing module 205 and risk engine 207. Having generated an identity and risk score, the authentication platform 103 delivers the authentication data—i.e., identity and risk score, KBA—to the browser application 105, corresponding to step 413. In steps 415 and 417 respectively, the browser application 105 confirms the authenticity of the web application services provider associated with the web application based on the received information (e.g., the identity and risk score) and sends an authentication response. The affirmative authentication response provides authentication of the user of the browser application 105 to the web application 118. In another step 419, the web application 118 confirms the authenticity of the user of the browser application 105. It is noted that, in optional step 421, the web application 118 and browser application 105 may commence with the transaction based on the confirmed authenticity of the parties.

The exemplary techniques and systems presented herein provide parties engaged in a transaction over a network with authentication information for indicating a degree or level of trustworthiness, validity, authenticity or legitimacy of the other parties. Also, the methods herein pertain to means for authenticating parties without compromising the integrity of the transaction or jeopardizing the anonymity of the involved parties. By way of example, it is noted that the authentication platform 103 provides various techniques for acquiring, assessing and scoring behavior information representative of a first party associated with a first application. This information may be further utilized to authenticate the second party associated with a second application.

The processes described herein for providing authentication using behavioral information may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
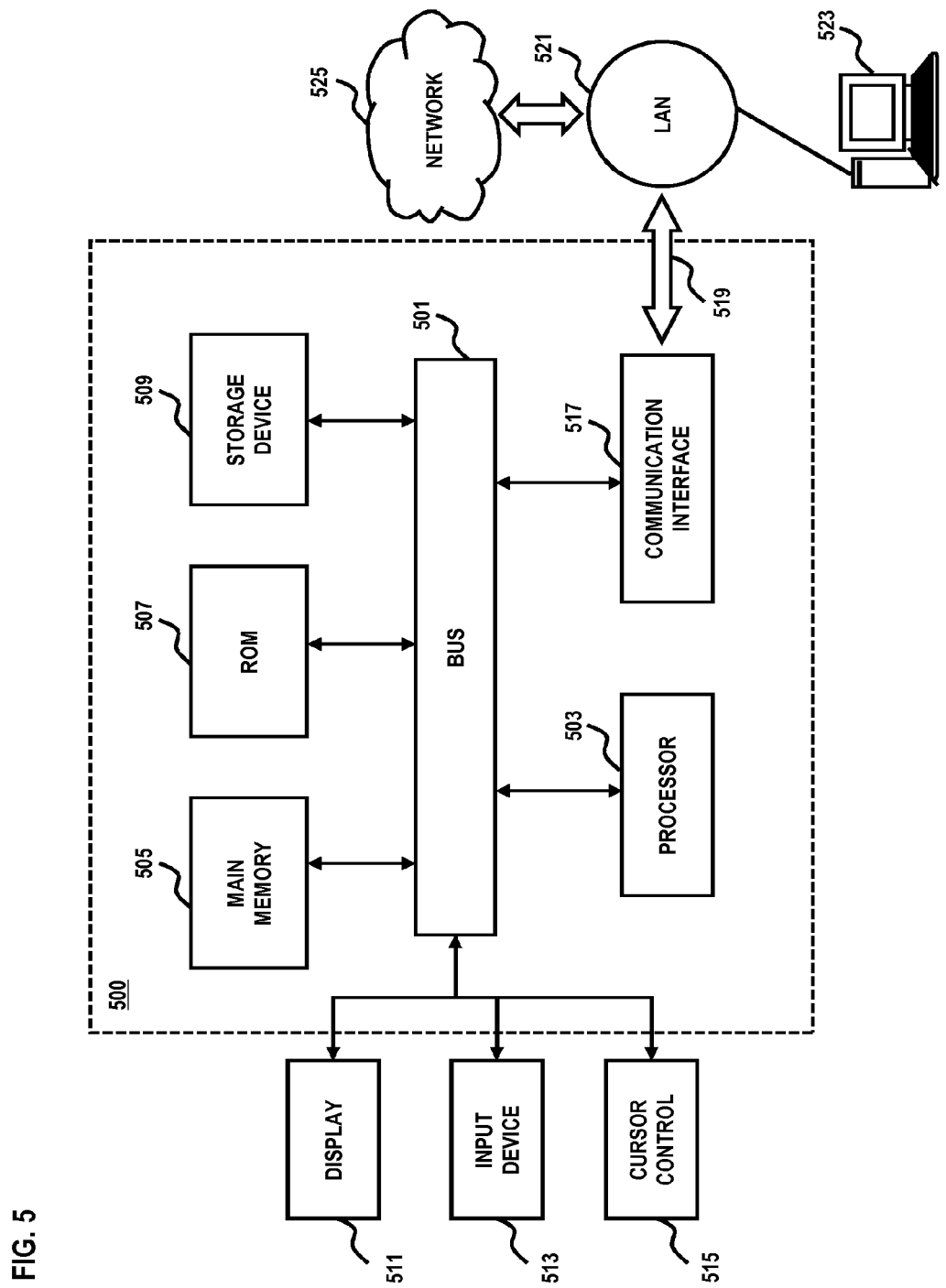
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 either use electrical, electromagnetic or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 6:
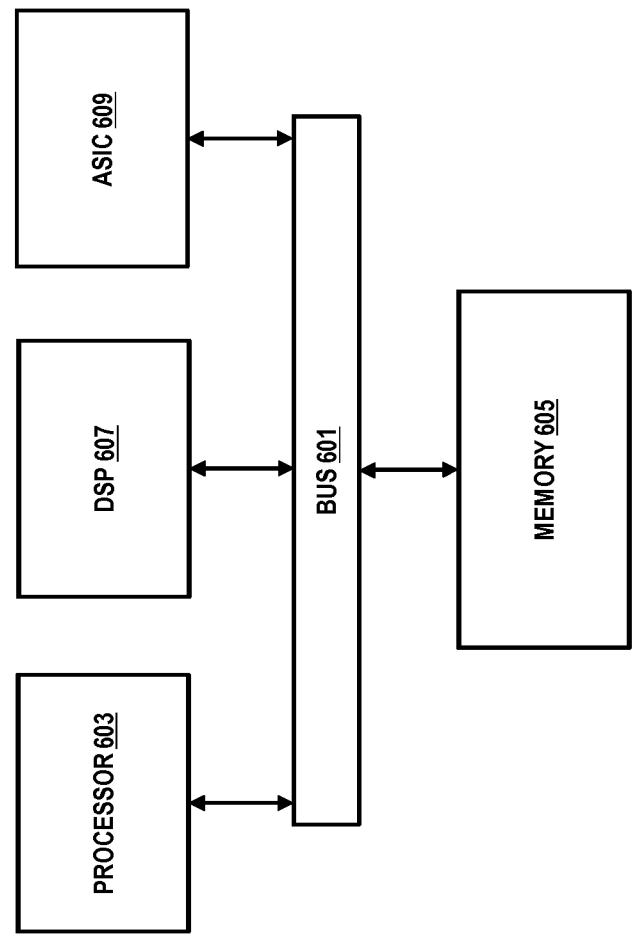
FIG. 6 is a diagram of a chip set that can be used to implement an embodiment of the invention.

FIG. 6 illustrates a chip set or chip 600 upon which an embodiment of the invention may be implemented. Chip set 600 is programmed to authenticate respective members engaged in a web-based transaction without compromising the integrity or anonymity of respective members as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of authenticating respective members engaged in a web-based transaction without compromising the integrity or anonymity of respective members.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to authenticate respective members engaged in a web-based transaction without compromising the integrity or anonymity of respective members. The memory 605 also stores the data associated with or generated from execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:
1. A method comprising:
receiving, from a first application associated with a first party, an authentication request that has been redirected in response to a transaction initiated with a second application associated with a second party;
determining, by a processor device of a third party, behavioral information associated with the first party and the second party;
forwarding, to the first application and the second application, knowledge based assessment information, that is based on the behavioral information, for authenticating the second party and the first party to each other;
receiving from the first application a first response made by the second party to the knowledge based assessment information, and authenticating the second party to the first party by matching the first response with context data detected by one or more sensors of a device of the second party, wherein the context data includes real time geo-location data of the second party; and receiving from the second application a second response made by the first party to the knowledge based assessment information, and authenticating the first party to the second party by matching the second response with behavioral dynamics of the first party and the second party, wherein the behavioral dynamics include behavioral patterns of the first and second parties collaborating over a network, and wherein at least one of the first party and the second party is at least partially authenticated via the matched first response, the matched second response, or a combination thereof.

2. A method according to claim 1, further comprising:
receiving an identification score and/or a risk score from a risk engine; and
including the identification score and/or the risk score, in the knowledge based assessment information for the first party and the second party to authenticate each other thereby sending the first and second responses to the processor device,
wherein the context data detected at the device of the first party, at the device of the second party, or a combination thereof, includes environmental data associated with the device of the first party, the device of the second party, or a combination thereof, and
wherein the behavioral dynamics include call log information of the first party and the second party.

3. A method according to claim 2, further comprising:
determining to transmit the behavioral information associated with the first party and the second party to the risk engine configured to execute pattern matching and predictive analytics to determine the identification score and/or the risk score,
wherein when the first and second parties are authenticated to each other, the transaction is permitted while the first and second parties remain anonymous to each other.

4. A method according to claim 1, wherein the first application is a browser application configured to generate the authentication request, and the transaction involves requesting a web page from the second application, the method further comprising:
redirecting an authentication assertion message through the browser application to the second application.

5. A method according to claim 1,
wherein the behavioral patterns are characterized by behavioral characteristics of client/server collaboration schemes, autonomic systems, web-based response systems, or a combination thereof, associated with the collaborating over the network.

6. A method according to claim 2, wherein when the first or second response to the knowledge based assessment information is not matched with the respective context data, the transaction is denied while the first and second parties remain anonymous to each other, and
wherein the context data detected at the device of the first party, at the device of the second party, or a combination thereof, is detected and matched in real time.

7. A method according to claim 1,
wherein the first party and the second party are mutually authenticated via the matched first response and the matched second response.

8. An apparatus comprising:
at least one processor device; and
at least one memory device including computer program code for one or more programs,
the at least one memory device and the computer program code configured to, with the at least one processor device, cause the apparatus to perform at least the following,
receive, from a first application associated with a first party, an authentication request that has been redirected in response to a transaction initiated with a second application associated with a second party,
determine behavioral information associated with the first party and the second party,
forward, to the first application and the second application, knowledge based assessment information, that is based on the behavioral information, for authenticating the second party and the first party to each other,
receive from the first application a first response made by the second party to the knowledge based assessment information, and authenticating the second party to the first party by matching the first response with context data detected by one or more sensors of a device of the second party, wherein the context data includes real time geo-location data of the second party, and
receive from the second application a second response made by the first party to the knowledge based assessment information, and authenticating the first party to the second party by matching the second response with behavioral dynamics of the first party and the second party,
wherein the behavioral dynamics include behavioral patterns of the first and second parties collaborating over a network,
wherein the apparatus is associated with a third party, and
wherein at least one of the first party and the second party is at least partially authenticated via the matched first response, the matched second response, or a combination thereof.

9. An apparatus according to claim 8, wherein the apparatus is further caused to:
receive an identification score and/or a risk score from a risk engine, and
wherein the one or more identification score and/or the risk score is included in the knowledge based assessment information for the first party and the second party to authenticate each other, thereby sending the first and second responses to the processor device.

10. An apparatus according to claim 9, wherein the apparatus is further caused to:
determine to transmit the behavioral information associated with the first party and the second party to a risk engine configured to execute pattern matching and predictive analytics to determine the identification score and/or the risk score,
wherein when the first and second parties are authenticated to each other, the transaction is permitted while the first and second parties remain anonymous to each other.

11. An apparatus according to claim 8, wherein the first application is a browser application configured to generate the authentication request, and the transaction involves requesting a web page from the second application, the apparatus being further caused to:
redirect an authentication assertion message through the browser application to the second application.

12. An apparatus according to claim 8, wherein the behavioral information associated with the first party and the second party relates to a network address or geolocation of the first party, call log information for authenticating the first party, or a combination thereof, and wherein the knowledge based assessment information includes behaviors of the first and second parties collaborating over a network.

13. An apparatus according to claim 8, wherein the apparatus is further caused to:

communicate with one or more web services to determine the behavioral information associated with the first party and the second party, the behavioral information associated with the first party and the second party including real-time behavioral information associated with the first party and the second party.

14. A non-transitory computer-readable storage medium carrying one or more sequences of one or more instructions which, when executed by one or more processors, cause a system to at least perform the following:

cause an authentication platform to receive, from a first application associated with a first party, an authentication request that has been redirected in response to a transaction initiated with a second application associated with a second party, wherein the authentication platform is further configured to determine behavioral information associated with the first party and the second party; and cause a risk engine to determine an identification score and/or a risk score as knowledge based assessment information for the first party and the second party to authenticate each other thereby sending a first response and a second response to the processor device, wherein the authentication platform is associated with a third party and the system is further caused, at least in part, to, forward, to the first application and the second application, the knowledge based assessment information, that is based on the behavioral information, for authenticating the second party and the first party to each other, receive from the first application a first response made by the second party to the knowledge based assessment information, and authenticating the second party to the first party by matching the first response with context data detected by one or more sensors of a device of the second party, wherein the context data includes real time geo-location data of the second party, and receive from the second application a second response made by the first party to the knowledge based assessment information, and authenticating the first party to the second party by matching the second response with behavioral dynamics of the first party and the second party, wherein the behavioral dynamics include behavioral patterns of the first and second parties collaborating over a network, and wherein at least one of the first party and the second party is at least partially authenticated via the matched first response, the matched second response, or a combination thereof.

15. A non-transitory computer-readable storage medium according to claim 14, wherein the system is further caused to perform:

cause the risk engine to execute pattern matching and predictive analytics to determine the identification score and/or the risk score, wherein when the first and second parties are authenticated to each other, the transaction is permitted while the first and second parties remain anonymous to each other.

16. A non-transitory computer-readable storage medium according to claim 14, wherein the first application is a browser application configured to generate the authentication request, and the transaction involves requesting a web page from the second application.

17. A non-transitory computer-readable storage medium according to claim 14, wherein the behavioral information associated with the first party and the second party relates to a network address or geolocation of the first party, call log information for authenticating the first party, or a combination thereof, and wherein the knowledge based assessment information includes behaviors of the first and second parties collaborating over a network.

18. A non-transitory computer-readable storage medium according to claim 14, wherein the system is further caused to perform:

cause the authentication platform to communicate with one or more web services to determine the behavioral information associated with the first party and the second party, and the behavioral information associated with the first party and the second party includes real-time behavioral information associated with the first party and the second party.

19. A method according to claim 2, wherein at least one of the first response and the second response is matched based, at least in part, on whether the identification score and/or the risk score meet one or more pre-determined thresholds.

20. A method according to claim 7, wherein the behavioral information includes one or more transactions, one or more activities, or a combination thereof, associated with the first party and the second party.

* * * * *